US007889735B2

(12) United States Patent
Grosse

(10) Patent No.: US 7,889,735 B2
(45) Date of Patent: Feb. 15, 2011

(54) METHOD AND APPARATUS FOR DEFENDING AGAINST DENIAL OF SERVICE ATTACKS IN IP NETWORKS BASED ON SPECIFIED SOURCE/DESTINATION IP ADDRESS PAIRS

(75) Inventor: Eric Henry Grosse, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1463 days.

(21) Appl. No.: 11/197,841

(22) Filed: Aug. 5, 2005

(65) Prior Publication Data
US 2007/0030850 A1 Feb. 8, 2007

(51) Int. Cl.
H04L 12/28 (2006.01)
H04L 12/56 (2006.01)
(52) U.S. Cl. ...................................... 370/392
(58) Field of Classification Search ............. 370/325, 370/392, 230, 239, 237; 713/201, 151; 726/22, 726/23, 24, 25
See application file for complete search history.

(56) References Cited

U.S. PATENT DOCUMENTS

| | | | | |
|---|---|---|---|---|
| 5,198,607 | A * | 3/1993 | Livingston et al. | 89/1.11 |
| 5,907,485 | A * | 5/1999 | Van Loo et al. | 700/3 |
| 6,594,268 | B1 * | 7/2003 | Aukia et al. | 370/400 |
| 6,611,521 | B1 * | 8/2003 | McKay et al. | 370/392 |
| 6,834,037 | B2 | 12/2004 | Hansson et al. | 370/216 |
| 7,197,009 | B1 * | 3/2007 | Dispensa | 370/237 |
| 7,301,899 | B2 * | 11/2007 | Goldstone | 370/230 |
| 2002/0032793 | A1 * | 3/2002 | Malan et al. | 709/232 |
| 2002/0032854 | A1 * | 3/2002 | Chen et al. | 713/151 |
| 2002/0118644 | A1 * | 8/2002 | Moir | 370/230.1 |

(Continued)

FOREIGN PATENT DOCUMENTS

WO WO 02/25402 3/2002

(Continued)

OTHER PUBLICATIONS

Lakshminarayanan, K. et al., "Taming IP Packet Flooding Attacks," ACM SIGCOMM Computer Communication Review, vol. 34, Issue 1 (Jan. 2004), Column: Papers from Hotnets-II, pp. 45-50, 2004.

(Continued)

*Primary Examiner*—Daniel Wu
*Assistant Examiner*—Frederick Ott
(74) *Attorney, Agent, or Firm*—Kenneth M. Brown

(57) ABSTRACT

A method and apparatus for defending against a Denial of Service attack wherein a target victim of an attack has recognized the existence of an attack and identified its source. The carrier network which provides service to the victim automatically receives one or more IP (Internet Protocol) source/destination IP address pairs from the victim, and then limits (e.g., blocks) the transmission of packets from the identified source address to the identified destination address. The carrier may implement this filtering capability as a stand-alone box included in the network, or as a line card incorporated into otherwise conventional network elements already present in the network. The source/destination address pairs to be blocked may be advantageously communicated from the victim with use of security signatures and with use of redundant connections from the victim to the carrier network to ensure receipt even under congested network conditions.

20 Claims, 2 Drawing Sheets

U.S. PATENT DOCUMENTS

| | | | |
|---|---|---|---|
| 2002/0138599 A1* | 9/2002 | Dilman et al. | 709/223 |
| 2003/0037141 A1 | 2/2003 | Milo et al. | 709/225 |
| 2004/0054925 A1* | 3/2004 | Etheridge et al. | 713/201 |
| 2005/0050364 A1* | 3/2005 | Feng | 713/201 |
| 2005/0157647 A1* | 7/2005 | Sterne et al. | 370/235 |
| 2005/0216955 A1* | 9/2005 | Wilkins et al. | 726/23 |
| 2006/0077964 A1* | 4/2006 | Wu et al. | 370/352 |
| 2006/0098585 A1* | 5/2006 | Singh et al. | 370/252 |
| 2006/0156407 A1 | 7/2006 | Cummins | 726/25 |
| 2006/0174130 A1 | 8/2006 | Noble | 713/182 |

FOREIGN PATENT DOCUMENTS

| | | |
|---|---|---|
| WO | WO 03/001333 A2 | 1/2003 |
| WO | WO 03/005666 | 1/2003 |

OTHER PUBLICATIONS

Argyraki, K. et al., "Active Internet Trafice Filtering: Real-Time Response to Denial-of-Service Attacks," USENIX Association, 2005 USENIX Annual Technical Conference, pp. 135-148, Apr. 10, 2005.

Marques, P. et al., "Dissemination of flow specification rules", IETF Internet Draft draft-marques-idr-flow-spec-02.txt, Dec. 2004.

PCT International Search Report dated Aug. 12, 2006.

* cited by examiner

METHOD AND APPARATUS FOR DEFENDING AGAINST DENIAL OF SERVICE ATTACKS IN IP NETWORKS BASED ON SPECIFIED SOURCE/DESTINATION IP ADDRESS PAIRS

CROSS-REFERENCE TO RELATED APPLICATION

The present application is related to co-pending U.S. patent application Ser. No. 11/197,842, "Method And Apparatus For Defending Against Denial Of Service Attacks In IP Networks By Target Victim Self-Identification And Control," filed by E. Grosse and T. Woo on even date herewith and commonly assigned to the assignee of the present invention.

FIELD OF THE INVENTION

The present invention relates generally to the field of computer security in packet based communications networks such as Internet Protocol (IP) networks, and in particular to a method and apparatus for defending against Denial of Service attacks in such networks wherein a carrier network service provider of a target victim controls the routing of malicious packets based on a specification of source/destination IP address pairs which has been received automatically from the target victim itself to identify malicious packets.

BACKGROUND OF THE INVENTION

Each day, many thousands of new "zombies" join the pool of hijacked PCs (Personal Computers) sending spam to e-mail users and launching Denial of Service (DoS) attacks against e-commerce sites, government resources, and other network infrastructure. In fact, it has been estimated that as many as 170,000 zombie machines are added to the Internet daily. Denial of service (DoS) attacks in particular can cause major service disruptions when limited resources need to be allocated to the attackers instead of to legitimate uses. Such attacks have been estimated to have resulted in over $26,000,000 of losses in calendar year 2004. The attacking machines are usually compromised zombie machines controlled by remote masters, and typically inflict damage by sending vast numbers of IP (Internet Protocol) packets across the Internet directed to the target victim of the attack. The culprits who instigate such attacks range from teenagers aiming to take down small business to international criminal organizations attempting to extort money from large corporations.

Presently, there are two commonly used approaches for defending against such Denial of Service attacks—one which is largely manual and one which is automated. The first approach requires manual identification of the existence of an attack by the end user (i.e., the target victim), followed by a manual (e.g., telephone) report of the attack to the victim's service provider (i.e., carrier), combined with a request that the carrier identify the source of the reported attack and instigate a protective barrier to prevent packets which are part of the attack from getting through the network to the victim. Most typically, such an approach will result in the carrier identifying the source of the offending packets, followed by its refusal to accept any packets from that source (or at least any packets from that source which are destined for the particular attack victim which identified and reported the existence of the attack).

A second approach for defending against such Denial of Service attacks provides a more automated process which requires the service provider to include sophisticated "packet washer" or "scrubber" filters through which each and every packet destined for the end user to be protected must pass. That is, changes are made to the Internet routing tables so that all of the given end user's traffic is routed through such a filter, which examines each packet in turn in an attempt to decide whether the packet is malicious or not. If it does not appear to be malicious, it is forwarded on to the end user, but if it does appear to be malicious, it is filtered out and discarded.

Each of these approaches however have significant limitations. The first approach requires substantial manual intervention and often may not be capable of addressing the problem of an attack until significant damage has already been done. And the second approach is unable to leverage application analysis of packets, since often, only the target is able to extract, and thus analyze, the data contents of the packet. (For example, if cryptographic protocols are used, it is typically only the ultimate destination of the packet that is capable of decoding the encoded packet data.) Moreover, a leveraged attack on a victim's application may not be based only on excessive bandwidth, but rather, may result from certain types of functional requests. Thus, a solution to the problem of Denial of Service attacks is needed wherein the attacks are promptly recognized, identified, and (preferably without manual intervention) stopped.

SUMMARY OF THE INVENTION

I have recognized that while the best place to recognize the existence of a Denial of Service attack is at the target victim (who has the ultimate motivation to identify and address attacks on itself), the best place to defend against the attack is within the network (i.e., in the carrier's network). As such, in accordance with the principles of the present invention, the benefits of each of the two aforementioned prior art approaches may be advantageously realized without the corresponding disadvantages. In particular, the present invention provides a method and apparatus for defending against a Denial of Service attack wherein a carrier network which serves a given target victim limits transmission of malicious packets from a source to the target victim based on automated instructions from the target victim to do so. In particular, the target victim is assumed to have recognized the existence of an attack, identified the source of the attack, and automatically indicated to the carrier network how to identify the malicious packets based on specified source/destination IP address pairs.

More specifically, the present invention provides a method and apparatus for defending against Denial of Service attacks against a target victim, which is implemented in an Internet Protocol (IP) based carrier network which provides packet based communication services to the victim. The inventive method (or apparatus) comprises the steps of (or means for) receiving an automated indication from the victim alleging that a Denial of Service attack is being perpetrated; receiving from the victim one or more pairs of IP addresses comprising a source IP address and a destination IP address (where the destination IP address is one of the IP addresses associated with the victim); monitoring IP packet traffic through the network to identify IP packets having a source IP address and a destination IP address which match the source IP address and the destination IP address of one of the pairs of IP addresses received from the victim; and limiting (e.g., blocking) transmission of the identified IP packets (i.e., those having a source IP address and a destination IP address which matches the source IP address and the destination IP address of one of the pairs of IP addresses received from said victim).

DETAILED DESCRIPTION OF THE ILLUSTRATIVE EMBODIMENTS

Figure 1:
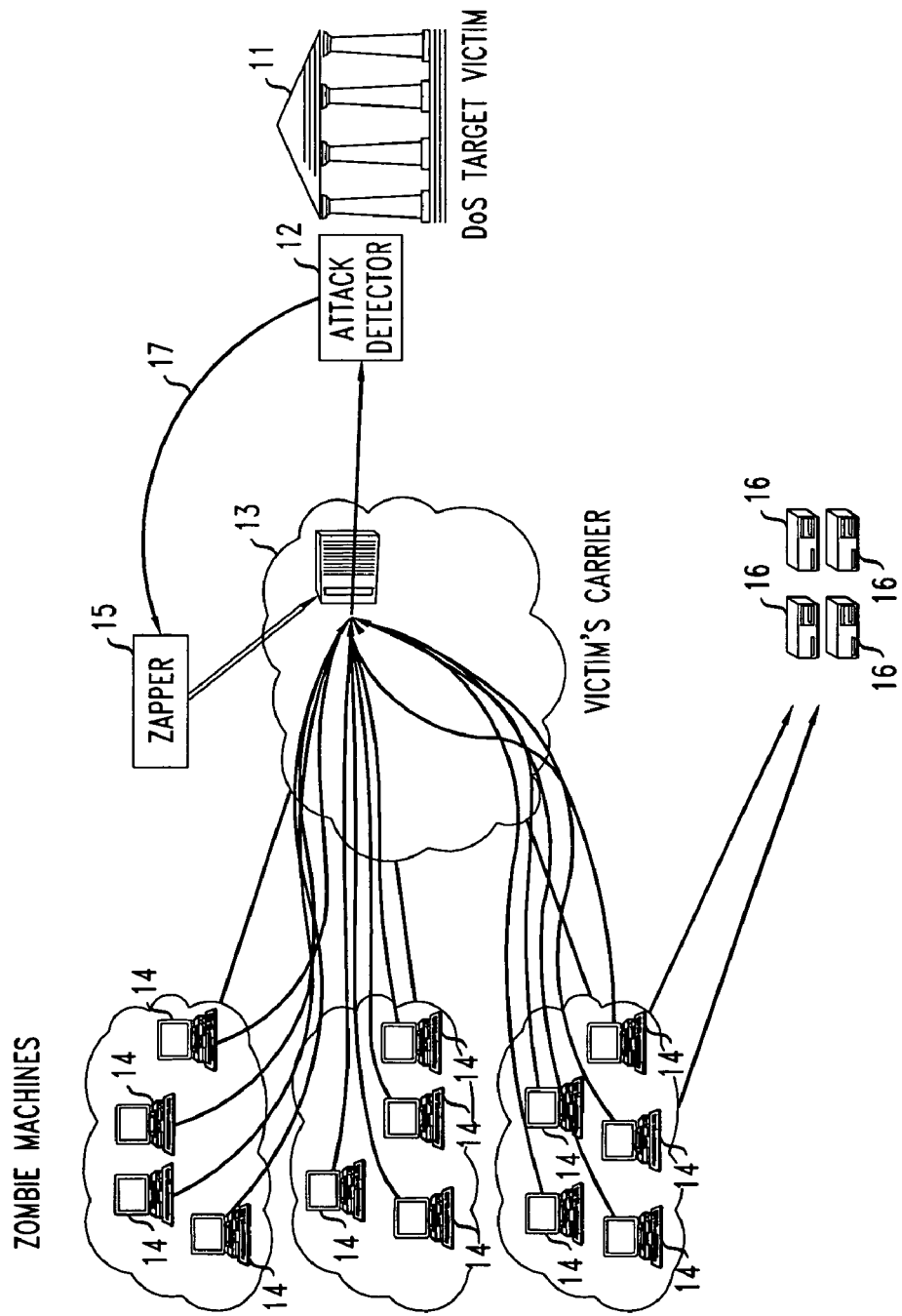
FIG. 1 shows a network environment in which an apparatus for defending against Denial of Service attacks in accordance with an illustrative embodiment of the present invention is employed.

In accordance with an illustrative embodiment of the present invention, a Zombie Attack Processor (hereinafter, "Zapper") provides a new type of security device that allows the victim of a Denial of Service attack to "push back" by denouncing attackers to its carrier, which will, in response, update a table of source/destination IP address pairs which are to be blocked. More specifically, upon recognizing that an attack is taking place, the victim will identify one or more pairs of source and destination IP addresses which are specified in packets deemed to be a part of the attack, and communicate those IP address pairs to its carrier for blocking.

Note that, in accordance with certain illustrative embodiments of the present invention, the attacker (i.e., the identified source IP address or addresses) need not be cut off completely from the network, but rather may be prohibited only from sending packets to the victim (i.e., the identified destination IP address or addresses). This may be advantageous, particular in the case where the identified source IP address or addresses represent a legitimate user which has been taken over (i.e., a zombie) for the given attack against the victim. Thus, the owner of the taken over machine may continue to use the system for legitimate purposes, while the attack being perpetrated on the victim (unbeknownst to the legitimate user) is nonetheless advantageously thwarted. Moreover, note that the technique in accordance with such illustrative embodiments of the present invention also advantageously provides protection from overly zealous identification of attackers by a given victim. Since, in accordance with the principles of the present invention, the identification of an attack is left to the discretion of the apparent victim, it is clearly advantageous that only traffic to the given victim is being cut off or restricted.

Advantageously, the denunciation protocol could include security signatures so that the Zapper infrastructure itself could not be used to launch a Denial of Service attack. Moreover, the protocol might advantageously make use of redundant connections to the carrier network, as well as redundant UDP (User Datagram Protocol), to ensure delivery even under congested network conditions. (UDP is an IP communications protocol which is fully familiar to those of ordinary skill in the art.) Advances in network processors and memories enable such a defense to be scaled to potentially large numbers of attackers—far beyond the capacity of earlier routers—advantageously without requiring manual intervention by either the victim or the carrier and hence capable of an extremely timely response.

In accordance with various illustrative embodiments of the present invention, such a Zapper filtering engine may be implemented as either a stand-alone box included in the carrier network, or, alternatively, as a line card incorporated into otherwise conventional network elements which are already present in the network. Moreover, in accordance with certain illustrative embodiments of the present invention, the Zapper filter may be advantageously deployed by the carrier within the network at a location relatively close to the attack origins, or it may be initially placed to advantageously defend premium customers from attack.

In accordance with various illustrative embodiments of the present invention, IP address pair entries to be blocked may either time out (i.e., be automatically removed after a predetermined elapsed period of time), or, alternatively, may be cleared by explicitly issued reprieves. In this manner, the network will advantageously return to a clean state without the need for the use of garbage collection algorithms. Illustratively, denouncers (i.e., customers of the carrier network who are enabled to identify and protect against attacks) may, for example, be given a limited number of "chits" (source/destination IP address pairs to be entered and blocked)—say, for example, on the order of a hundred thousand—which may, for example, be based proportionally on the amount of business that the given customer does with the given service provider (i.e., carrier).

Moreover, in accordance with certain illustrative embodiments of the present invention, network diagnosis may be advantageously provided by having the illustrative Zapper return an ICMP (Internet Control Message Protocol, fully familiar to those of ordinary skill in the art) unreachable message with, for example, some predetermined probability whenever a packet is dropped as having been identified as comprising a blocked source/destination IP address pair. Such an error return may, in accordance with one illustrative embodiment of the present invention, include a code which will enable the sender of the blocked packet to query a database for details regarding who placed the blocking request on such packets and, possibly, the reasons for such a request.

And, in accordance with certain illustrative embodiments of the present invention, supplementary tools might be advantageously provided as well. For example, such tools might include Internet server plug-ins for recognition of leveraged Denial of Service attacks, links to various IDS systems (Intrusion Detection Systems), databases for network diagnosis (see discussion above), and methods for providing guidance for placement of Zapper functionality within a given carrier's infrastructure. Illustrative embodiments of the present invention which provide various ones of these supplementary tools will be obvious to those skilled in the art in light of the disclosure herein.

Note that the operation of the Zapper filtering mechanism according to certain illustrative embodiments of the present invention is similar to that of a conventional firewall, except that it operates based on a potentially large number (e.g., millions) of very simple rules. In particular, the Zapper rules may be expressed in the form "if the source IP address of a given packet is a.b.c.d and the destination IP address of the packet is w.x.y.z, then block (i.e., drop) the packet."

And in accordance with other illustrative embodiments of the present invention, rather than prohibiting the transmission of packets with a given source and destination IP address, the Zapper filter may de-prioritize such packets. That is, the filtering mechanism may either assign such packets a low routing priority or enforce a packet rate limit on such packets. In either case, packets with the given source and destination IP addresses will be unable to have a significant effect on traffic and thus will no longer result in a successful Denial of Service attack on the victim.

In accordance with various illustrative embodiments of the present invention, attack detection may be advantageously recognized by the victim by algorithms of varying degrees of simplicity or sophistication, many of which will be obvious to those skilled in the art. For example, in accordance with one illustrative embodiment of the invention, application logs may be examined and an attack may be identified based solely on the presence of very high traffic levels (e.g., high packet rates) from either a single identified source or a plurality of identified sources. (Note that this is one conventional method of identifying the presence of a Denial of Service attack and will be familiar to those of ordinary skill in the art.)

In accordance with another illustrative embodiment of the invention, however, application based analysis of packet contents may be performed to identify packets or sequences of packets having a suspicious nature, such as, for example, recognizing that there have been frequent database searches for non-existent database elements; recognizing that there have been multiple requests apparently from a human being which occur at a higher rate than a person could initiate them; identifying syntactically invalid requests; and identifying suspicious amounts of traffic at particularly sensitive times in the operation of a normally occurring activity. (An example of the latter class of suspicious packets might be identified, for example, if a stock trading web site notices particularly disruptive traffic at a sensitive time during an imminent stock transaction.) And in accordance with other illustrative embodiments of the invention, a number of different indicia of a possible attack, which may include, for example, one or more of the above described situations, may be advantageously combined in a more sophisticated analysis to identify the presence of an attack.

FIG. 1 shows a network environment in which an illustrative apparatus for defending against Denial of Service attacks in accordance with an illustrative embodiment of the present invention is employed. The figure shows target victim 11 (which may, for example, be a bank or other financial institution). Note that target victim 11 is assumed to have one or more IP addresses (not shown) associated therewith. Also associated with target victim 11, in accordance with the principles of the present invention, is attack detector 12, which operates in accordance with an illustrative embodiment of the present invention to determine that a Denial of Service attack is being perpetrated on target victim 11.

Carrier network 13, the network carrier which provides service to target victim 11, receives IP packets from various sources and transmits them to target victim 11. As is shown in the figure, the IP packets being transmitted to the victim are, in fact, associated with a Denial of Service attack thereon, and are being sent by a large number of zombie machines 14. Carrier network 13 also includes zapper 15, which advantageously defends against Denial of Service attacks in accordance with an illustrative embodiment of the present invention.

More specifically, in operation and in accordance with the illustrative embodiment of the present invention, zapper 15 receives from attack detector 12, upon determining that a Denial of Service attack is being perpetrated on target victim 11, one or more source/destination IP address pairs. As a result, carrier network 13 advantageously limits (e.g., blocks) the transmission of IP packets whose source IP address and destination IP address match those of any of the received source/destination IP address pairs, thereby limiting (or eliminating) the Denial of Service attack from zombies 14 to attack victim 11. Note that zapper 15 advantageously receives the source/destination IP address pairs from attack detector 12 through redundant connection 17. Note also that IP packets transmitted from zombies 14 to unrelated servers 16 are advantageously not affected.

Figure 2:
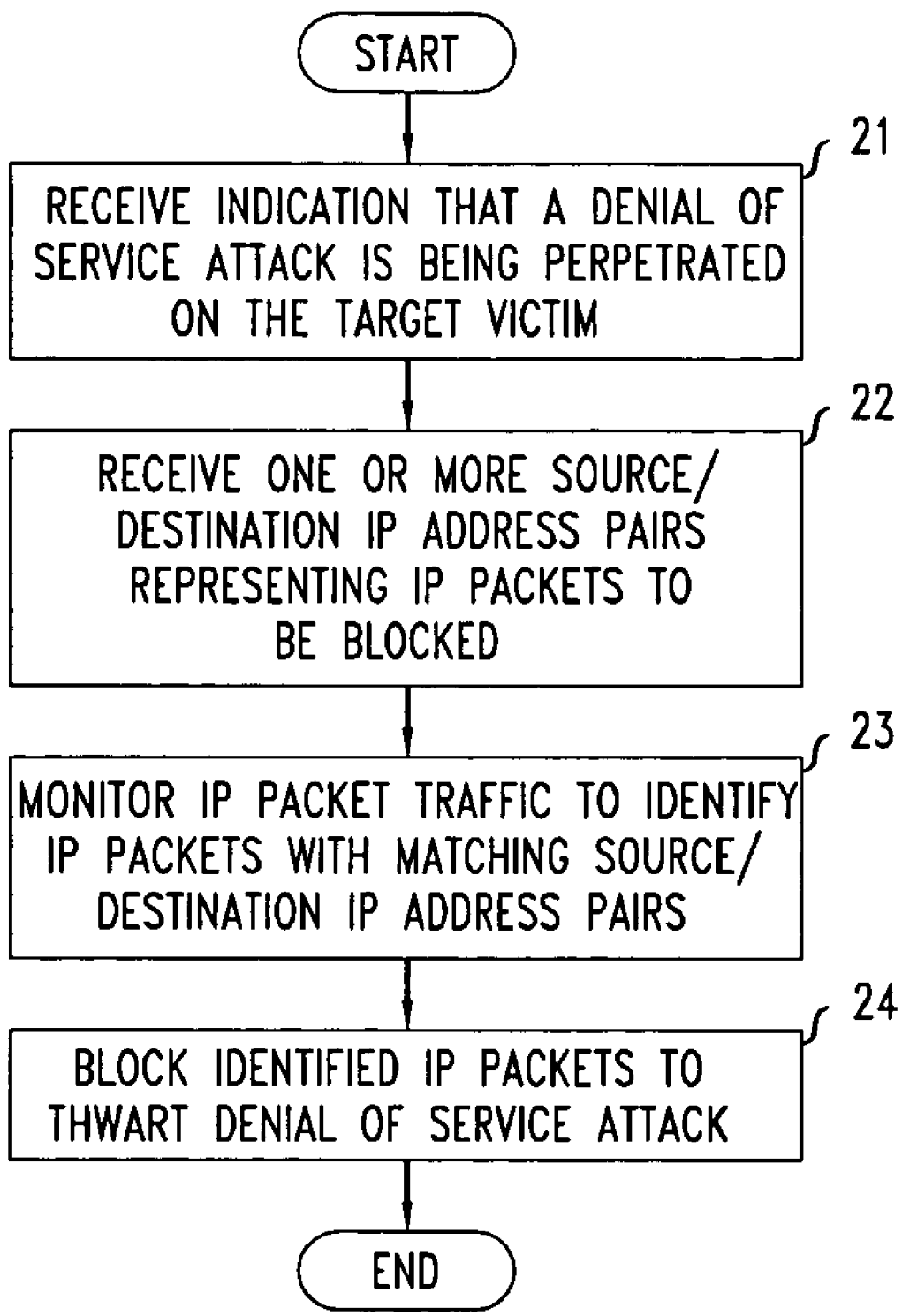
FIG. 2 shows a flow chart of a method for defending against Denial of Service attacks in accordance with an illustrative embodiment of the present invention.

FIG. 2 shows a flow chart of a method for defending against Denial of Service attacks in accordance with an illustrative embodiment of the present invention. The illustrative method of FIG. 2 is performed at a network carrier which serves a given target victim and begins (as shown in block 21) by receiving an indication that a Denial of Service attack is being perpetrated on the given target victim. Then (as shown in block 22), the network carrier receives one or more source/destination IP address pairs representative of IP packets that should be blocked in order to thwart the Denial of Service attack. (Illustratively, the source IP addresses are those of the attacking "zombie" machines and the destination IP addresses are those associated with the target victim itself.) Next (as shown in block 23), the network carrier monitors the IP packet traffic to identify IP packets whose source and destination IP addresses match one of the received source/destination IP address pairs. And finally (as shown in block 24), the network carrier blocks the identified IP packets, thereby thwarting the Denial of Service attack on the target victim.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. For example, although the present invention has been described specifically with respect to Internet Protocol (IP) networks, it will be obvious to those of ordinary skill in the art that the particular communications protocol used is not relevant to the principles of the present invention, and, therefore, the present invention can be used in an identical manner in the context of any data packet based network in which packets having source and destination addresses associated therewith are transmitted through the network.

In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

I claim:

1. A fully automated method for defending against denial of service attacks against a target victim, the method implemented in one or more devices located in a packet based carrier network which provides packet based communication services to said target victim by transmitting IP packets thereto, the target victim not being located within said packet based carrier network and having one or more IP addresses associated therewith, the method comprising the steps of:

receiving, at a device located in said packet based carrier network, an automated indication from said target victim alleging that a denial of service attack is being perpetrated thereupon, the denial of service attack comprising a plurality of malicious IP packets having been received by the target victim;

receiving, at a device located in said packet based carrier network, from said target victim one or more pairs of IP addresses representative of IP packets whose transmission is to be limited, each of said pairs of IP addresses comprising a source IP address and a destination IP address, wherein the destination IP address is one of said IP addresses associated with the target victim;

monitoring, at the one or more devices located in said packet based carrier network, IP packet traffic through at least a portion of the carrier network to identify IP packets having a source IP address and a destination IP address equal to the source IP address and the destination IP address comprised in one of said pairs of IP addresses received from said target victim; and limiting transmission within said packet based carrier network of said identified IP packets having a source IP address and a destination IP address equal to the source IP address and the destination IP address comprised in said one of said pairs of IP addresses received from said target victim and representative of IP packets whose transmission is to be limited.

2. The method of claim 1 wherein said step of limiting transmission of said identified IP packets having a source IP address and a destination IP address equal to the source IP address and the destination IP address comprised in said one of said pairs of IP addresses received from said target victim comprises preventing the transmission of said identified IP packets.

3. The method of claim 1 wherein said step of limiting transmission of said identified IP packets having a source IP address and a destination IP address equal to the source IP address and the destination IP address comprised in said one of said pairs of IP addresses received from said target victim comprises lowering a routing priority of said identified IP packets.

4. The method of claim 1 wherein said step of limiting transmission of said identified IP packets having a source IP address and a destination IP address equal to the source IP address and the destination IP address comprised in said one of said pairs of IP addresses received from said target victim comprises limiting transmission of said identified IP packets to no more than a predetermined packet rate.

5. The method of claim 1 wherein said step of receiving from said target victim one or more pairs of IP addresses comprises receiving from said target victim one or more pairs of IP addresses with use of a security signature.

6. The method of claim 1 wherein said step of receiving from said target victim one or more pairs of IP addresses comprises receiving from said target victim one or more pairs of IP addresses with use of a redundant connection from said target victim.

7. The method of claim 1 wherein said step of receiving from said target victim one or more pairs of IP addresses comprises receiving from said target victim one or more pairs of IP addresses with use of a redundant communications protocol.

8. The method of claim 1 further comprising the step of terminating the limiting of the transmission of one or more of said identified IP packets having a source IP address and a destination IP address equal to the source IP address and the destination IP address comprised in said one of said pairs of IP addresses received from said target victim after a predetermined period of time has elapsed since said one of said pairs of IP addresses was received from said target victim.

9. The method of claim 1 further comprising the steps of:
receiving from said target victim one or more pairs of IP addresses representative of IP packets whose transmission is to be no longer limited; and discontinuing the limiting of the transmission of said IP packets having a source IP address and a destination IP address equal to the source IP address and the destination IP address comprised in said one of said pairs of IP addresses received from said target victim and representative of IP packets whose transmission is to be no longer limited.

10. The method of claim 1 further comprising the step of transmitting an unreachable message back to said source IP address of one or more of said identified IP packets having a source IP address and a destination IP address equal to the source IP address and the destination IP address comprised in one of said pairs of IP addresses received from said target victim and representative of IP packets whose transmission is to be limited.

11. An automated apparatus for defending against denial of service attacks against a target victim, the apparatus located in a packet based carrier network which provides packet based communication services to said target victim by transmitting IP packets thereto, the target victim not being located within said packet based carrier network and having one or more IP addresses associated therewith, the apparatus comprising:

means for receiving an automated indication from said target victim alleging that a denial of service attack is being perpetrated thereupon, the denial of service attack comprising a plurality of malicious IP packets having been received by the target victim;

means for receiving from said target victim one or more pairs of IP addresses representative of IP packets whose transmission is to be limited, each of said pairs of IP addresses comprising a source IP address and a destination IP address, wherein the destination IP address is one of said IP addresses associated with the target victim;

means for monitoring IP packet traffic through at least a portion of the carrier network to identify IP packets having a source IP address and a destination IP address equal to the source IP address and the destination IP address comprised in one of said pairs of IP addresses received from said target victim and representative of IP packets whose transmission is to be limited; and means for limiting transmission of said identified IP packets having a source IP address and a destination IP address equal to the source IP address and the destination IP address comprised in said one of said pairs of IP addresses received from said target victim and representative of IP packets whose transmission is to be limited.

12. The apparatus of claim 11 wherein said means for limiting transmission of said identified IP packets having a source IP address and a destination IP address equal to the source IP address and the destination IP address comprised in said one of said pairs of IP addresses received from said target victim comprises means for preventing the transmission of said identified IP packets.

13. The apparatus of claim 11 wherein said means for limiting transmission of said identified IP packets having a source IP address and a destination IP address equal to the source IP address and the destination IP address comprised in said one of said pairs of IP addresses received from said target victim comprises means for lowering a routing priority of said identified IP packets.

14. The apparatus of claim 11 wherein said means for limiting transmission of said identified IP packets having a source IP address and a destination IP address equal to the source IP address and the destination IP address comprised in said one of said pairs of IP addresses received from said target victim comprises means for limiting transmission of said identified IP packets to no more than a predetermined packet rate.

15. The apparatus of claim 11 wherein said means for receiving from said target victim one or more pairs of IP addresses comprises means for receiving from said target victim one or more pairs of IP addresses with use of a security signature.

16. The apparatus of claim 11 wherein said means for receiving from said target victim one or more pairs of IP addresses comprises means for receiving from said target victim one or more pairs of IP addresses with use of a redundant connection from said target victim.

17. The apparatus of claim 11 wherein said means for receiving from said target victim one or more pairs of IP addresses comprises means for receiving from said target victim one or more pairs of IP addresses with use of a redundant communications protocol.

18. The apparatus of claim 11 further comprising means for terminating the limiting of the transmission of one or more of said identified IP packets having a source IP address and a destination IP address equal to the source IP address and the destination IP address comprised in said one of said pairs of IP addresses received from said target victim after a predetermined period of time has elapsed since said one of said pairs of IP addresses was received from said target victim.

19. The apparatus of claim 11 further comprising:
means for receiving from said target victim one or more pairs of IP addresses representative of IP packets whose transmission is to be no longer limited; and
means for discontinuing the limiting of the transmission of said IP packets having a source IP address and a destination IP address equal to the source IP address and the destination IP address comprised in said one of said pairs of IP addresses received from said target victim and representative of IP packets whose transmission is to be no longer limited.

20. The apparatus of claim 11 further comprising means for transmitting an unreachable message back to said source IP address of one or more of said identified IP packets having a source IP address and a destination IP address equal to the source IP address and the destination IP address comprised in one of said pairs of IP addresses received from said target victim and representative of IP packets whose transmission is to be limited.

* * * * *